United States Patent [19]

Nakagawa et al.

[11] Patent Number: 5,436,740

[45] Date of Patent: Jul. 25, 1995

[54] HOLOGRAPHIC STEREOGRAM

[75] Inventors: Akira Nakagawa; Eishi Morimatsu; Makiko Konoshima; Kiichi Matsuda, all of Kawasaki, Japan

[73] Assignee: Fujitsu Limited, Kanagawa, Japan

[21] Appl. No.: 88,650

[22] Filed: Jul. 9, 1993

[30] Foreign Application Priority Data

Sep. 30, 1992 [JP] Japan ............................ 4-262070

[51] Int. Cl.$^6$ .................... G03H 1/08; G03H 1/26
[52] U.S. Cl. ............................ 359/9; 359/21; 359/22; 359/23
[58] Field of Search ............... 359/3, 9, 21, 22, 23, 359/25

[56] References Cited

U.S. PATENT DOCUMENTS

| | | | |
|---|---|---|---|
| 3,608,993 | 9/1971 | De Bitetto | 350/3.5 |
| 4,104,489 | 8/1978 | Satoh et al. | 179/100.3 G |
| 4,701,006 | 10/1987 | Perlmutter | 350/3.66 |
| 4,778,262 | 10/1988 | Haines | 359/23 |
| 4,969,700 | 11/1990 | Haines | 350/3.66 |
| 4,983,003 | 1/1991 | Wreede et al. | 359/3 |
| 5,111,313 | 5/1992 | Shires | 359/23 |
| 5,168,375 | 12/1992 | Reisch et al. | 358/432 |

FOREIGN PATENT DOCUMENTS

| | | |
|---|---|---|
| 1278672 | 6/1969 | United Kingdom . |
| 1384963 | 4/1972 | United Kingdom . |
| WO90/04218 | 4/1990 | WIPO . |

OTHER PUBLICATIONS

Yatagai, T., "Stereoscopic Approach to 3-D Display Using Computer-Generated Holograms," Applied Optics, vol. 15, No. 11, Nov. 1976, pp. 2722 to 2729.
Takahashi et al, "Computer Generating Holograms for Testing Aspheric Lenses," Applied Optics, vol. 15, No. 2, Feb. 1976, pp. 546 to 549.
*Mathematical Handbook of Formulas and Tables,* Murray R. Spiegel, McGraw-Hill Book Company, New York, 1968, pp. 174 to 176.

*Primary Examiner*—Martin Lerner
*Attorney, Agent, or Firm*—Armstrong, Westerman, Hattori, McLeland & Naughton

[57] ABSTRACT

A holographic stereogram which includes a plurality of element holograms and which reproduces a stereoscopic image by irradiation of coherent light, wherein each element hologram is loaded with a modulation value (pattern) corresponding to the stereoscopic image, the modulation value being a one-dimensional or two-dimensional transform coefficient obtained by one-dimensional or two-dimensional sine transform or discrete sine transform of the distribution of the intensity of diffraction light expressing the stereoscopic image, enabling simplification of the drive system of the display device displaying the stereoscopic image and reproduction of the original stereoscopic image much more faithfully.

7 Claims, 9 Drawing Sheets

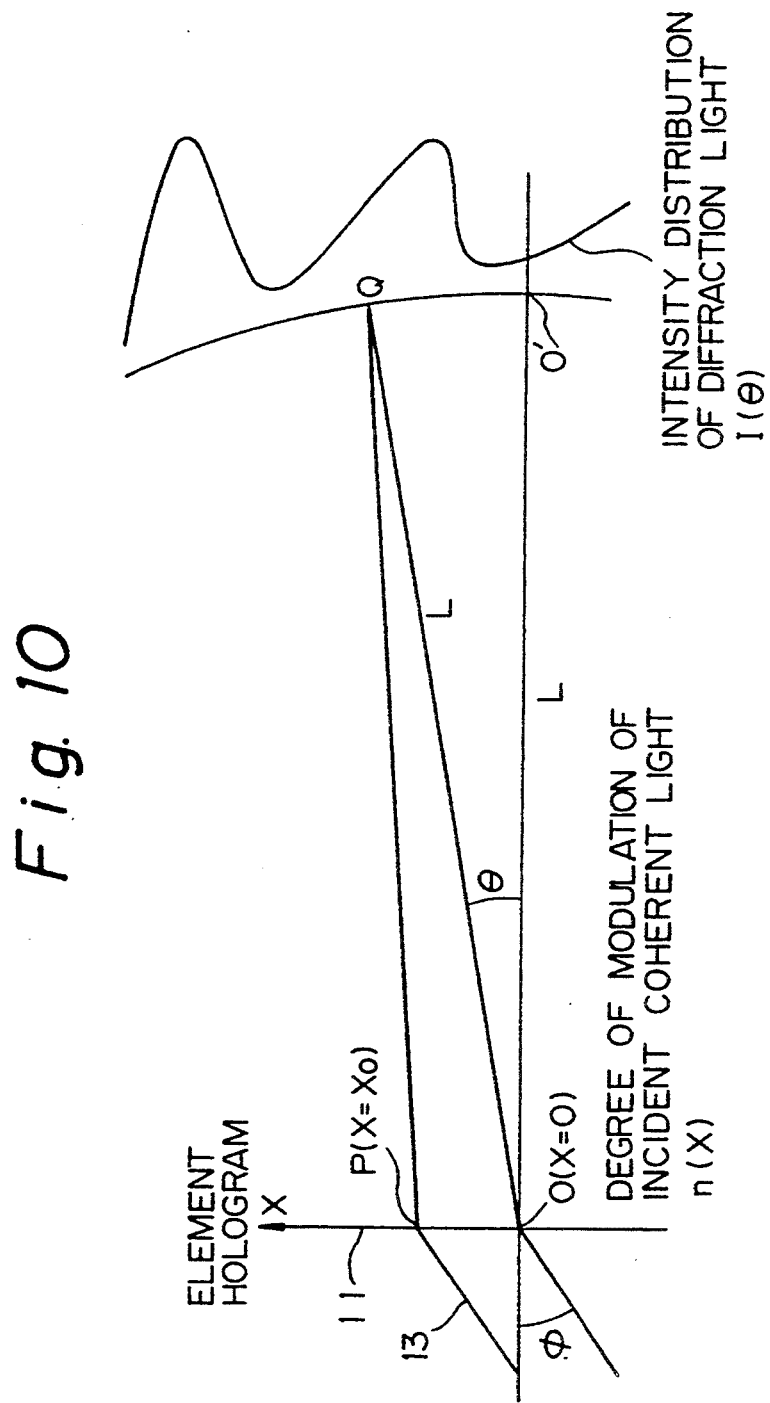

HOLOGRAPHIC STEREOGRAM

BACKGROUND OF THE INVENTION

1. Field of the Invention

The present invention relates to a holographic stereogram.

One of the technologies now being widely researched with the aim of visually reproducing stereoscopic images is holographic stereograms. Holographic stereograms are comprised of an array of a plurality of element holograms. Each of these element holograms is loaded with a unique modulation value corresponding to the stereoscopic image to be reproduced. By irradiating these element holograms with coherent light, the stereoscopic image is visually reproduced.

2. Description of the Related Art

As explained later in detail, the conventional methods for calculating the modulation values (pattern) to be loaded to the element holograms to realize a computer generated one-dimensional holographic stereogram are:

(a) The method using Fourier series expansion and (b) The method of using discrete Fourier transform by making discrete the distribution of intensity of diffraction light with respect to the angle (angle from the center of an element hologram to points in a block AB).

If finding the modulation values by the above-mentioned conventional methods by performing a Fourier transform or discrete Fourier transform, in general since the Fourier transform ($F(\omega)$) of (x) is expressed by $$F(\omega) = \frac{1}{\sqrt{2\pi}} \int_{-\infty}^{\infty} f(x) e^{-j x \omega} dx \quad (1)$$

not only the real component, but also the imaginary component appears. The same holds true for both one-dimensional and two-dimensional holographic stereograms.

Therefore, if trying to faithfully reproduce the distribution of intensity of diffraction light, it is necessary that the display device not only be able to perform modulation of the amplitude (amplitude modulation), but also be able to perform modulation of the index of refraction (phase modulation). Accordingly, there is the first problem that the drive system of the display device becomes complicated.

Further, in general, in a Fourier transform, it is known, the converted energy exists up to the higher order terms. As a result, there is the second problem that it becomes difficult to establish the condition (assumption) of the "point of sight being sufficiently far compared with the size of the element hologram" and therefore faithful reproduction of the distribution of intensity of diffraction light is inhibited.

SUMMARY OF THE INVENTION

Therefore, the present invention, in consideration of the above problems, has as its object the provision of a holographic stereogram which enables the drive system of the display device for visually reproducing the stereoscopic image to be simplified and which enables faithful reproduction of the distribution of intensity of diffraction light as in the original stereoscopic image.

To attain the above-mentioned object, the present invention provides a holographic stereogram which is comprised of an array of a plurality of element holograms and reproduces a stereoscopic image by irradiation of coherent light. The element holograms are loaded with modulation values (pattern) corresponding to the stereoscopic image. The modulation values are one-dimensional or two-dimensional transform coefficients obtained by one-dimensional or two-dimensional sine transform or discrete sine transform of the distribution of intensity of diffraction light expressing the stereoscopic image.

BRIEF DESCRIPTION OF THE DRAWINGS

The above object and features of the present invention will be more apparent from the following description of the preferred embodiments with reference to the accompanying drawings, wherein;

FIG. 10 is a view explaining the compensation of the degree of modulation of the index of refraction.

DESCRIPTION OF THE PREFERRED EMBODIMENTS

Before describing the embodiments of the present invention, the prior art and the problems therein will be first described with reference to the related figures.

Figure 1:
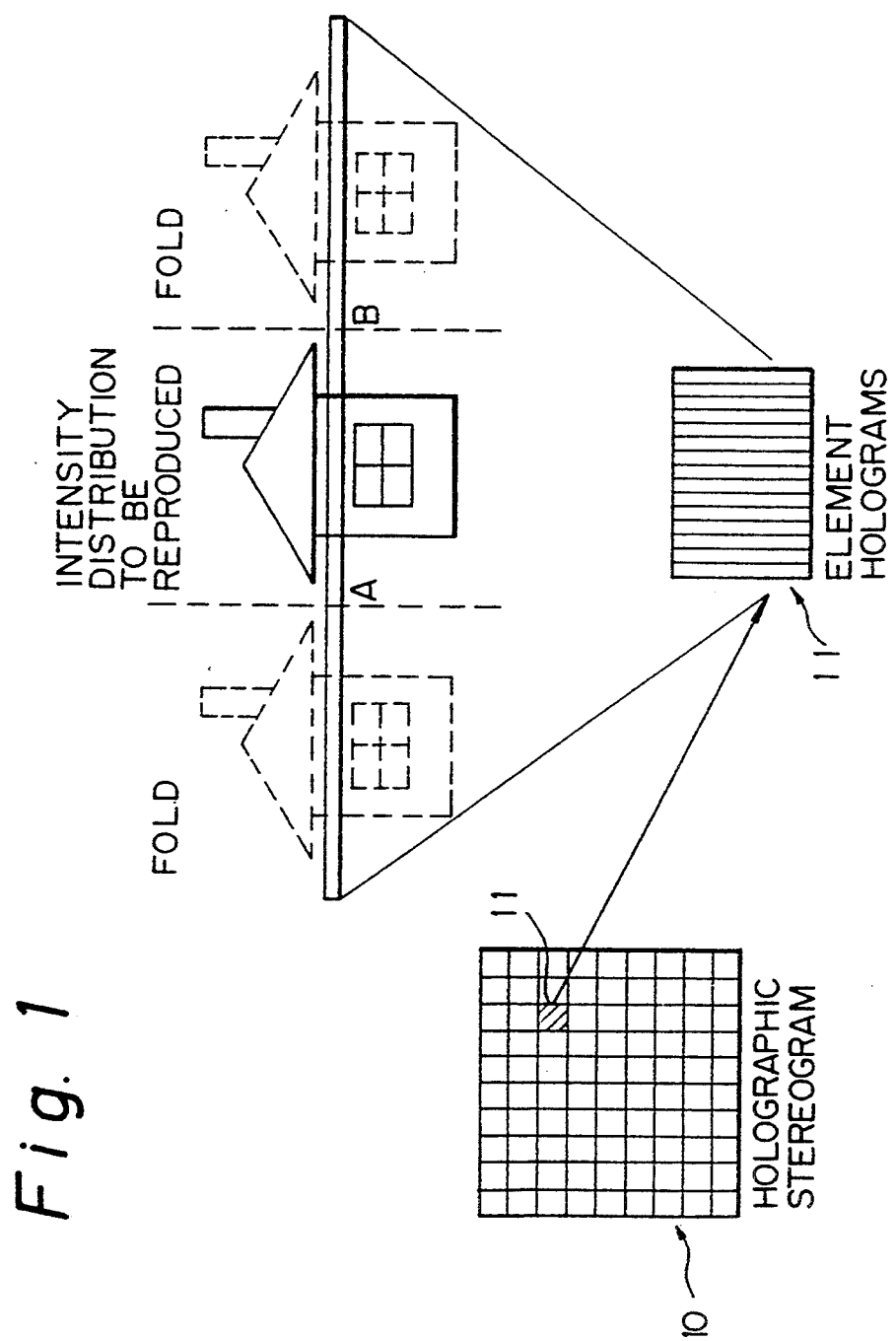
FIG. 1 is a view explaining a conventional computer-generated one-dimensional holographic stereogram.

FIG. 1 is a view explaining a conventional computer-generated one-dimensional holographic stereogram. In the figure, 10 is the holographic stereogram to be finally reproduced. It is comprised of an array of a plurality of element holograms 11. Each of the element holograms 11 is loaded with a unique modulation value corresponding to the stereoscopic image to be reproduced, Further, each of the element holograms 11 is divided into a plurality of cells.

According to the example shown in the figure, the stereoscopic image to be reproduced by the element hologram 11 is a house. The image shows the distribution of intensity of diffraction light.

The above-mentioned computer-generated one-dimensional holographic stereogram 10 is known as technique for obtaining a stereoscopic image by a simpler method than a usual hologram by omitting the three-dimensional effect in the vertical direction.

In a one-dimensional holographic stereogram, however, it is known that the pattern of an element hologram (modulation value to be loaded) is equal to the result of a Fourier transform applied to the distribution of intensity of diffraction light (image shown itself) in the horizontal direction (left-right in the figure) under the condition that the "point of sight is sufficiently far compared with the size of the element hologram". This will be clarified by the following description and with reference to FIG. 10.

As already mentioned, the conventional methods for calculating the modulation values (patterns) to be loaded to the element holograms 11 to realize a computer generated one-dimensional holographic stereogram 10 are:

(a) The method using Fourier series expansion and
(b) The method of using discrete Fourier transform by making discrete the distribution of intensity of diffraction light with respect to the angle (angle from center of an element hologram to points in a block AB).

The concept of the use of the technique of the above (a) or (b) is illustrated in FIG. 1. With these techniques, the view scope is limited to the block AB shown, so as shown in FIG. 1, the actual distribution of intensity of diffraction light is periodic. The periodic distributions are usually called "folds" and are shown by the broken line images in the figure.

The distribution of the modulation values found by the technique of (a) or (b) (patterns of element holograms) is displayed on a display device able to spatially modulate the light intensity, such as a liquid crystal. In the case of (a), the one-dimensional Fourier series of the distribution of intensity of diffraction light of the block AB is loaded and the element hologram sought is formed. All the other element holograms are formed in the same way to give a computer-generated one-dimensional holographic stereogram. This above also applies to a computer-generated two-dimensional holographic stereogram.

Figure 2:
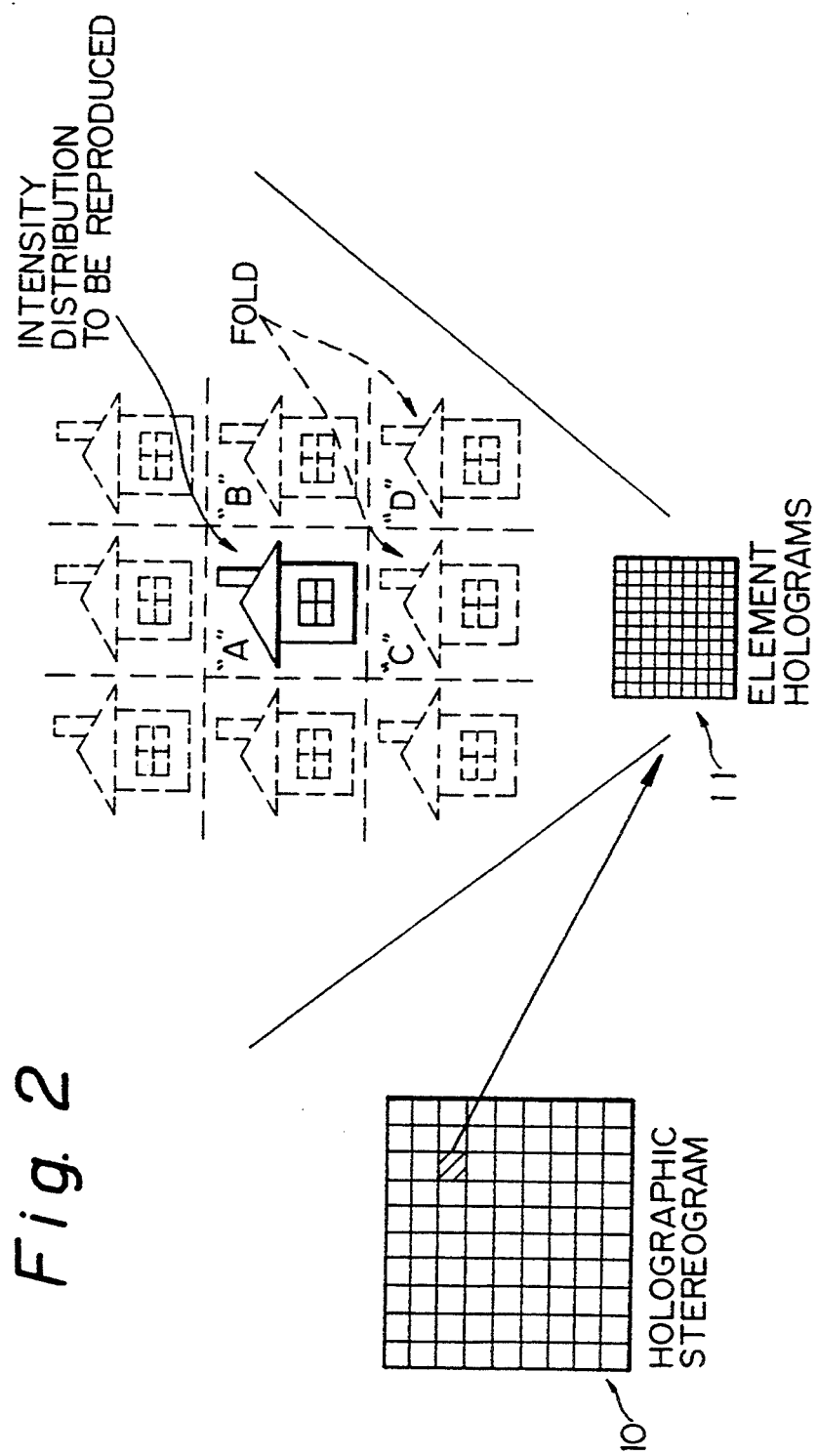
FIG. 2 is a view explaining a conventional computer-generated two-dimensional holographic stereogram.

FIG. 2 is a view explaining a conventional computer-generated two-dimensional holographic stereogram. A computer-generated two-dimensional holographic stereogram is known as a technique for obtaining a stereoscopic image by a simpler method than a real hologram in the same way as FIG. 1 since simple methods of calculation are known when using a computer.

Even in the case of a computer-generated two-dimensional holographic stereogram, the technique of (a) or (b) mentioned above is used. The Fourier transform is performed limiting the view scope to the area "A" shown in FIG. 2. Therefore, as shown in FIG. 2, the actual distribution of intensity of diffraction light which is reproduced becomes periodic (forms folds) in the same way as FIG. 1.

Further, in the same way as the case of FIG. 1, the distribution of modulation values found by the technique of (a) or (b) (patterns of element holograms) is expressed on a display device able to spatially modulate the light intensity, such as a liquid crystal. In the case of (a), the two-dimensional Fourier series of the distribution of the intensity of diffraction light desired to be reproduced at the area "A" is loaded and the element hologram sought is formed. All the other element holograms are formed in the same way to obtain a computer-generated two-dimensional holographic stereogram.

If finding the modulation values by the above-mentioned conventional methods by performing a Fourier transform or discrete Fourier transform, in general since the Fourier transform $(F(\omega))$ of $f(x)$ is expressed by the above-mentioned equation (1), not only the real component, but also the imaginary component appears. The same holds true for both one-dimensional and two-dimensional holographic stereograms.

Therefore, as mentioned earlier, the first and second problems occur.

Therefore, the present invention provides a holographic stereogram which enables the drive system of the display device for visually reproducing the stereoscopic image to be simplified and which enables faithful reproduction of the distribution of intensity of diffraction light as in the original stereoscopic image.

Figure 3:
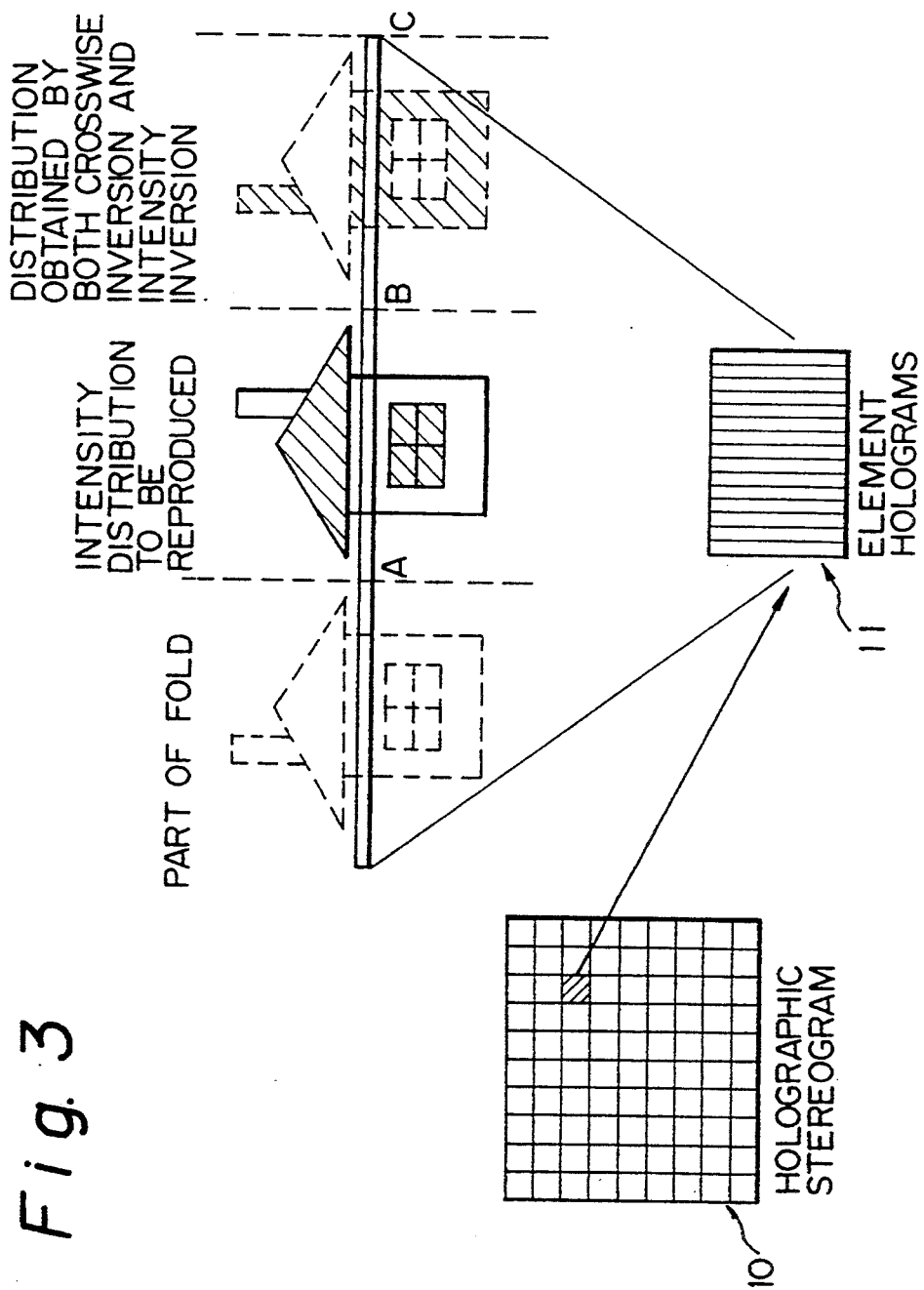
FIG. 3 is a view explaining a computer-generated one-dimensional holographic stereogram according to the present invention.
Figure 4:
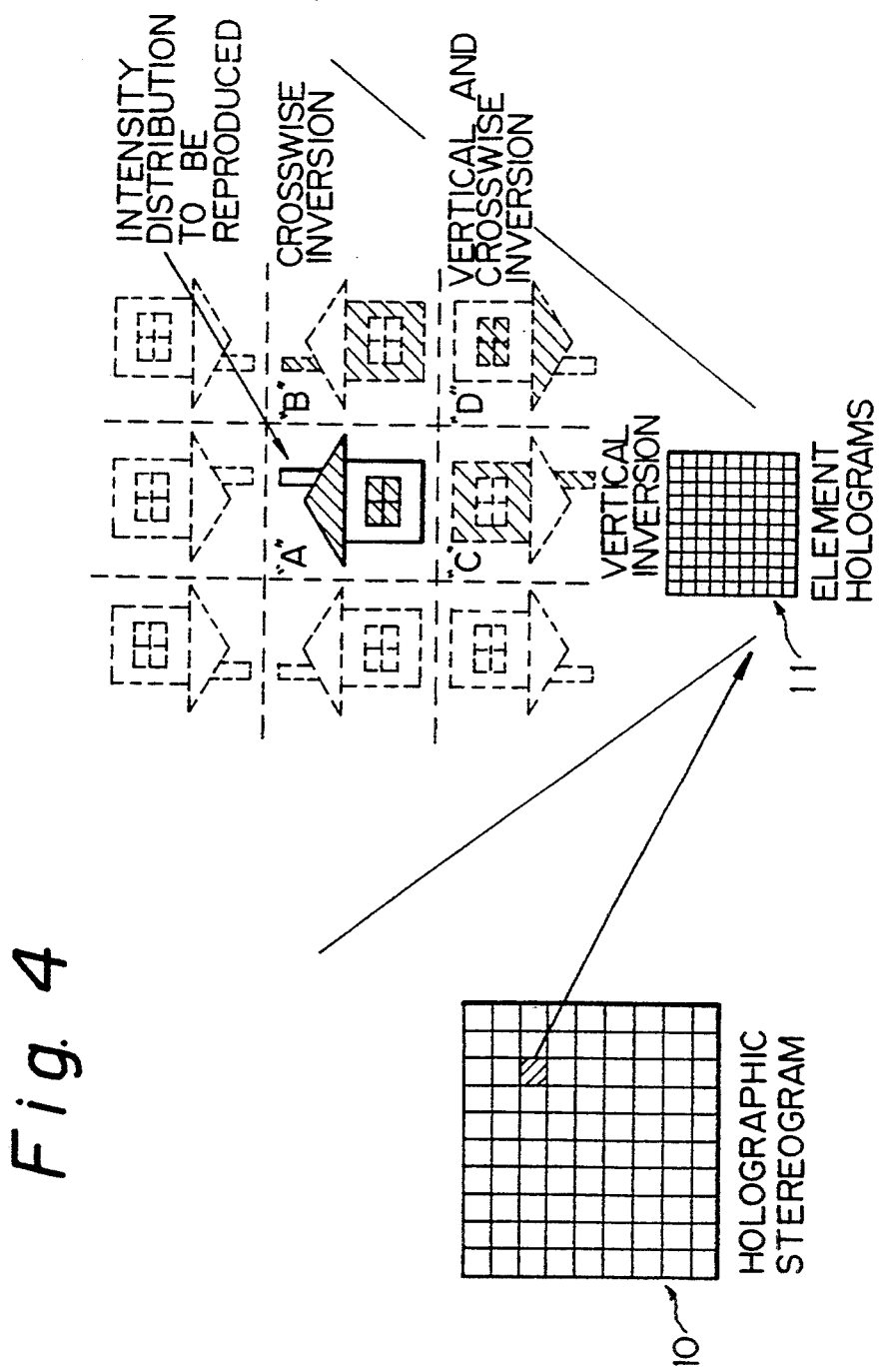
FIG. 4 is a view explaining a computer-generated two-dimensional holographic stereogram according to the present invention.

FIG. 3 is a view explaining a computer-generated one-dimensional holographic stereogram according to the present invention. Further, FIG. 4 is a view explaining a computer-generated two-dimensional holographic stereogram according to the present invention.

The present invention provides a holographic stereogram which is comprised of an array of a plurality of element holograms 11 each loaded with unique modulation values corresponding to the stereoscopic image to be reproduced and which reproduces a stereoscopic image by irradiation of the element holograms 11 with coherent light, wherein the element holograms are given modulation values by transform coefficients obtained by sine transform or discrete sine transform of the distribution of the intensity of diffraction light expressing the stereoscopic image to be reproduced.

More specifically, in the above-mentioned liquid crystal or other display device, the amplitude is changed in accordance with the modulation values in one-to-one correspondence with the element holograms 11 to form the element holograms. In FIG. 3, modulation values comprised of one-dimensional sine transform coefficients are loaded to the element hologram 11 and arrayed in one direction to realize a computer-generated one-dimensional holographic stereogram. In FIG. 4, modulation values comprised of two-dimensional sine transform coefficients are loaded to the element holograms 11 and arrayed two-dimensional to realize a computer-generated two-dimensional holographic stereogram.

Referring first to FIG. 3, the distribution of intensity of diffraction light desired to be reproduced exists in the block AB, but the block BC having a distribution of intensity of diffraction light which is virtually crosswise inverted and intensity inverted ("distribution obtained by both crosswise inversion and intensity inversion" in the figure) can be considered to be simultaneously reproduced with the block AB. That is, the block AC is formed as the hologram. Note that in the figure, to show the intensity inverted image, the light and dark areas of each portion are shown by the presence or absence of hatching. To reproduce such a distribution of intensity one diffraction light, the modulation values (pattern) to be loaded in the element holograms 11 are obtained by performing a Fourier serges expansion or a discrete Fourier transform on the distribution of intensity of diffraction light present in the block AB.

There is no cosine component, however, in the modulation value of the block AC obtained here. The reason is that, in FIG. 3, the distribution of the block AC is inverted crosswise and inverted in intensity about the point B. The distribution of the block AC becomes an odd function, so the cosine component in the above-mentioned $e^{jxt}$ ($=\cos xt + j\sin xt$) disappears.

In the end, the Fourier transform on the distribution of intensity in the block AC becomes equivalent to a sine transform or discrete sine transform of the distribution of intensity in the block AB. In this case, a distribution obtained by both crosswise inversion and intensity inversion is virtually introduced as the distribution of the block BC, but this block BC is outside the view scope of the block AB and therefore there is no problem with the introduction of the block BC.

In the above-mentioned sine transform and discrete sine transform, all the transform coefficients (modulation values to be loaded) has a constant phase, i.e., $\pi/2$. Therefore, when realizing a display device, it is sufficient to modulate only the amplitude and the drive system of the display device is simplified. In general, when considering the vector $\cos\theta + j\sin\theta$, unless both the $\cos\theta$ component and the $\sin\theta$ component are 0, the phase component ($\theta$) expressed by $\tan\theta$ ($=\sin\theta/\cos\theta$) appears, so at this time it is necessary to consider not only modulation of the amplitude, but also the modulation of the phase (index of refraction). Since as mentioned above, however, the cosine component is 0, it is sufficient to find the modulation value for only the amplitude.

The above-mentioned sine transform and discrete sine transform correspond to the generally known orthogonal transform in image processing techniques and therefore it can be easily understood that the above-mentioned transform coefficients concentrate at the lower order terms. As a result, the afore-mentioned condition (assumption) that the "point of sight is sufficiently far compared with the size of the element hologram" can be sufficiently satisfied and faithful reproduction of the distribution of intensity of diffraction light becomes possible.

The above applies to the computer-generated two-dimensional holographic stereogram shown in FIG. 4 as well.

Referring first to FIG. 4, the distribution of the intensity of diffraction light desired to be reproduced exists in the area "A", but the areas "B", "C" and "D" having distributions of intensity of diffraction light obtained virtually by vertical and crosswise inversion and intensity inversion ("crosswise inversion", "vertical and crosswise inversion", and "vertical inversion" in the figure) can be considered to be simultaneously reproduced with the area "A". That is, the areas "A", "B", "C", and "D" are formed as holograms. Note that the intensity inversion is shown by hatching. To reproduce such a distribution of intensity of diffraction light, the modulation values (pattern) to be loaded in the element holograms 11 are obtained by performing a two-dimensional Fourier series expansion or two-dimensional discrete Fourier transform on the distribution of intensity of diffraction light present in the areas "A","B","C", and "D" according to the previously mentioned conventional techniques.

There is no cosine component, however, in the modulation value of the areas "A", "B", and "C",and "D" obtained here.

In the end, the Fourier transform on the distribution of intensity in the areas "A" to "D" becomes equivalent to a two-dimensional sine transform or two-dimensional discrete sine transform of the distribution of intensity of the area "A". In this case, a distribution obtained by both vertical and crosswise inversion and intensity inversion is virtually introduced as the distribution of the areas "B", "C", and "D", but the areas "B", "C", and "D" are outside the view scope of the area "A" and therefore there is no problem with the introduction of the areas "B", "C", and "D".

In the above-mentioned two-dimensional sine transform and two-dimensional discrete sine transform, all the two-dimensional transform coefficients (modulation values to be loaded) are real numbers. Therefore, when realizing a display device, it is sufficient to modulate only the amplitude and the drive system of the display device is simplified.

Further, the above-mentioned two-dimensional sine transform and two-dimensional discrete sine transform correspond to the generally known orthogonal transform in image processing techniques and therefore it can be easily understood that the above-mentioned two-dimensional transform coefficients concentrate at the lower order terms. As a result, the afore-mentioned condition (assumption) that the "point of sight is sufficiently far compared with the size of the element hologram" can be sufficiently satisfied and faithful reproduction of the distribution of intensity of diffraction light becomes possible.

Figure 5:
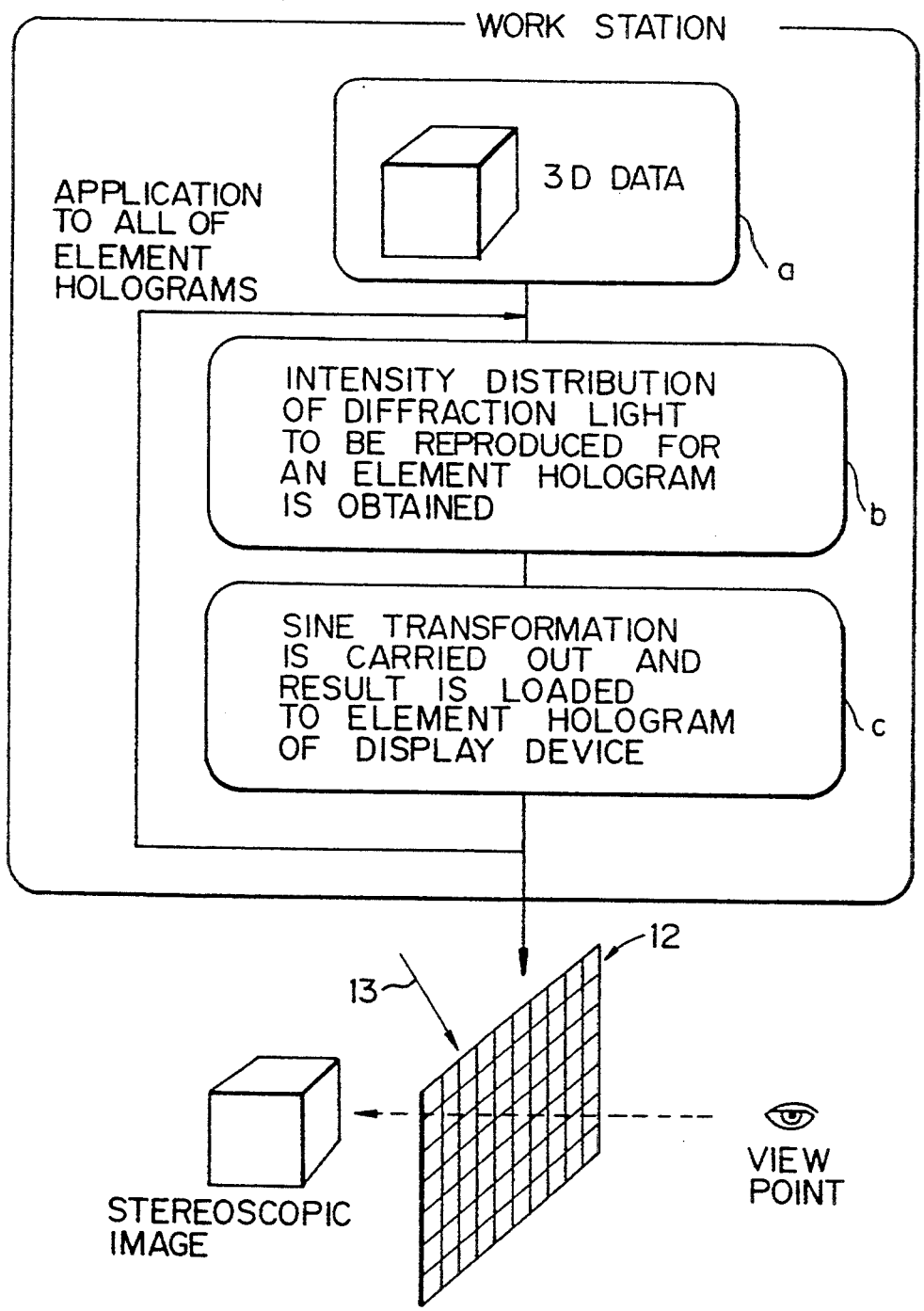
FIG. 5 is a view showing an embodiment of a routine for producing a holographic stereogram according to the present invention.

FIG. 5 is a view showing an embodiment of a routine for producing a holographic stereogram according to the present invention. Note that the embodiment in this figure may be applied to both computer-generated one-dimensional holographic stereograms and computer-generated two-dimensional holographic stereograms. In this embodiment, CAD data is displayed as a stereoscopic image using a work station. The CAD data is three-dimensional data showing the three-dimensional coordinates of the stereoscopic image. This is shown as "3D data" in block a in the figure.

Next, the distribution of intensity of diffraction light which an element hologram 11 is to reproduce (corresponding to the image of a house shown in FIG. 3 or FIG. 4) is found. This Is shown by the block b in the figure. Note that the steps up to here are the same as those performed in the past.

The characterizing feature of the present invention shown in block c. Here, a sine transform is performed on the distribution of intensity of diffraction light. The resultant one-dimensional or two-dimensional transform coefficient is loaded in the element hologram as the modulation value.

For example, in a display device 12 formed by a liquid crystal, the modulation values corresponding to the element holograms are loaded to obtain a desired pattern. By irradiating coherent light (reproducing light) to the thus realized display device 12, it is possible to view a stereoscopic image specified by the 3D data.

FIG. 5 shows an example of the technique for loading the one-dimensional or two-dimensional transform coefficients (modulation values) obtained by performing a sine transform in the display device 12 corresponding to the element holograms.

That is, if the number of samples per element hologram 11 is N (N is a positive number), the sine transform coefficients are loaded at 2N points. Here the corresponding sine transform coefficients are loaded as will be explained with reference to FIGS. 6 and 7.

Figure 6:
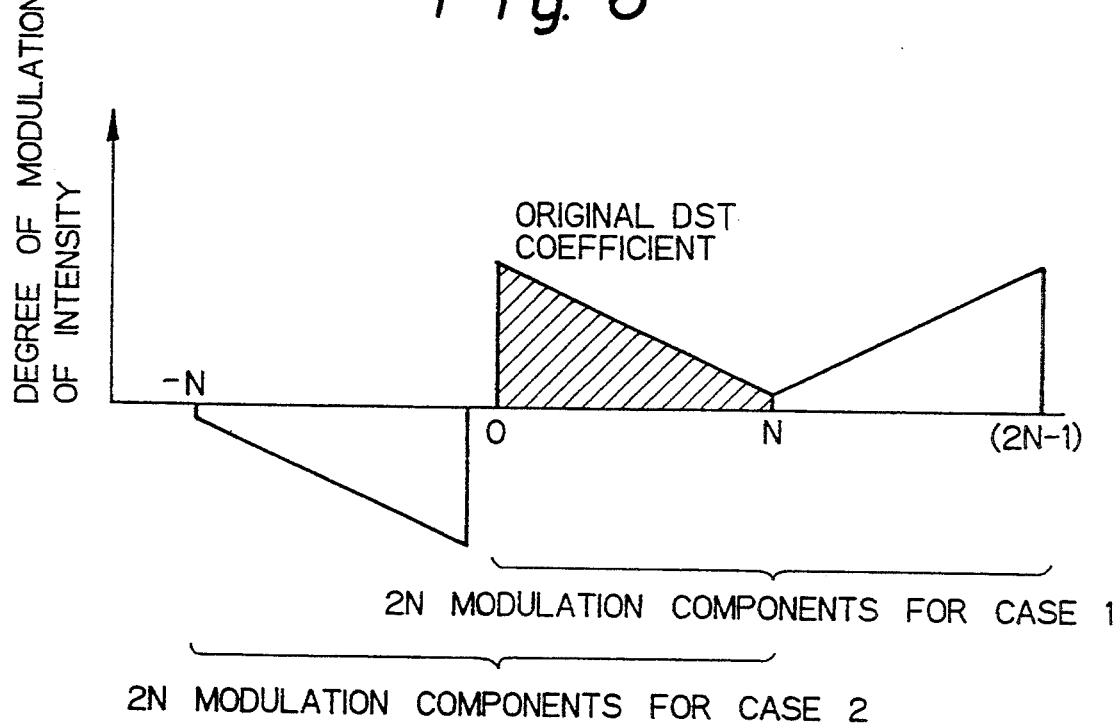
FIG. 6 is a view showing the method of loading sine transform coefficients in a display device.
Figure 7:
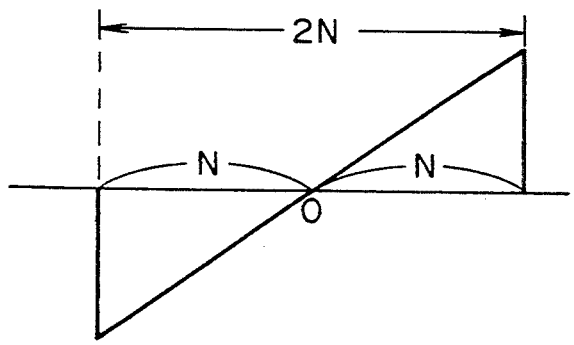
FIG. 7 is a view mathematically explaining a discrete sine transform on 2N number of samples.

FIG. 6 is a view showing the method of loading sine transform coefficients in a display device. FIG. 7 is a view mathematically explaining a discrete sine transform on a 2N number of samples. Generally speaking, if the number of samples for each of the element holograms is N (N being a positive integer), an N number of the sine transform coefficients and another N number of sine transform coefficients which are obtained by rearranging or inverting the sine transform coefficients are both produced over 2N modulation components and are loaded on the display device. In this case, although the explanation is given with reference to a one-dimensional holographic stereogram, the same also applies to a two-dimensional holographic stereogram. In the latter case, the 2N modulation components are adopted in not only an X axis, but also a Y axis, the X-Y axes defining the two-dimensional hologram (2N×2N).

A loading of the coefficients of the holographic stereogram by using a discrete sine transform will be explained below.

A function $f_n$ (n=0 to N−1) on each point N along a space axis is subjected to a discrete sine transform to obtain the following function $F_k$, where the function $f_n$ represents an actual image to be reproduced.

$$F_k = 2 \sum_{n=0}^{N-1} f_n \sin(\pi/N \cdot (n + 1/2)k) \quad (2)$$

The equation (2) expresses a definition of a discrete sine transform.

For an actual display of an image to be reproduced, it is necessary to load the 2N points of the coefficients on the display device 12. This will be explained by taking two cases, i.e., a Case 1 and a Case 2, as examples.

Case 1

2N points, i.e., $F_0$ to $F_{2N-1}$ are loaded on the display device by taking k=0 to N to 2N−1 (refer to FIG. 6).

When 2N−1≧k≧N, k' is defined as k'=2N−k. The equation is rewritten as k=2N−k'. This is substituted in the above equation (2) to obtain the following equations.

$$F_k = F_{2N-k'}$$
$$= 2 \sum_{n=0}^{N-1} f_n \sin(\pi/N \cdot (n + 1/2)(2N - k'))$$
$$= 2 \sum_{n=0}^{N-1} f_n \sin(\pi(2n + 1) - (\pi/N \cdot (n + 1/2)k'))$$
$$= 2 \sum_{n=0}^{N-1} f_n \sin(\pi/N \cdot (n + 1/2)k')$$
$$= F_{k'}$$
$$= F_{2N-k}$$

Also, the relationship $F_0 = 0$ stands, when k=0.

Figure 8:
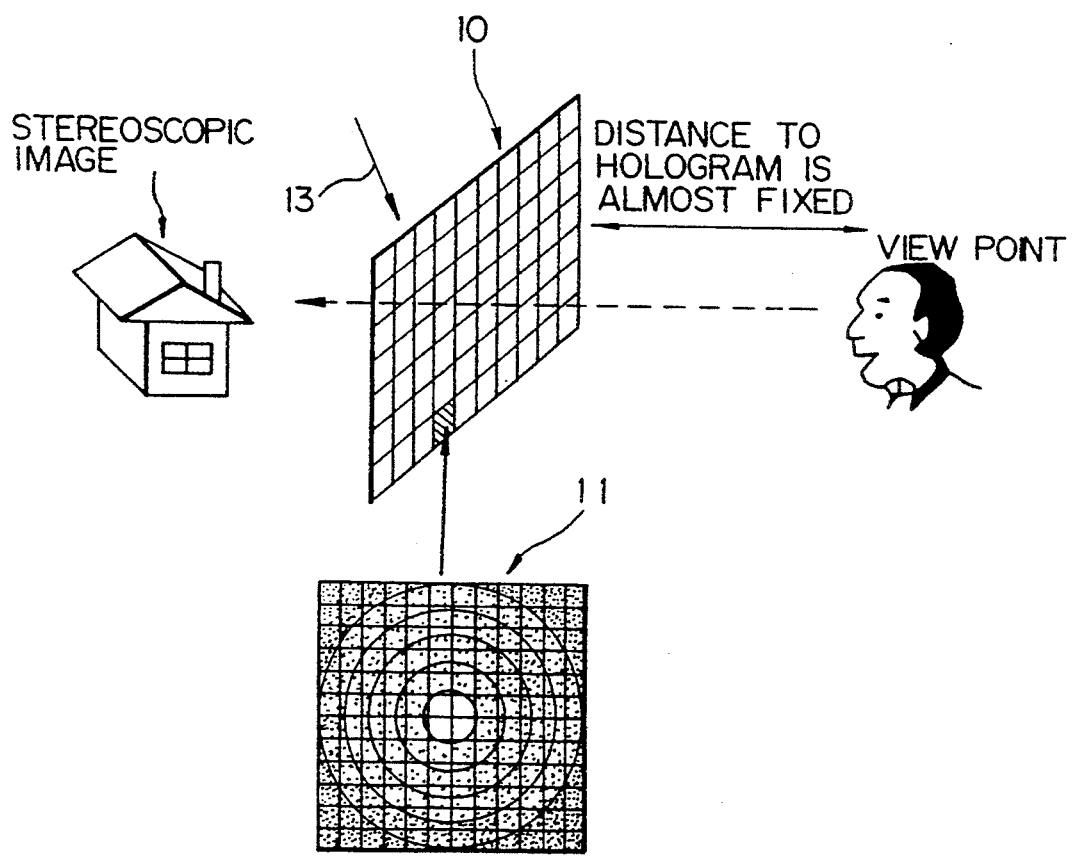
FIG. 8 is a view showing the state of application of compensation of the degree of modulation of the index of refraction for an element hologram.

The above 2N points are loaded on the display device 12. If the thus loaded display device 12 is illuminated by a light 13 as shown in FIG. 8, a light intensity at a point m on a space on which the image is to be displayed (refer to FIG. 10), can be calculated as follows.

$$\sum_{k=0}^{2N-1} \alpha e^{j\pi/N \cdot (m+1/2)k} \cdot F_k$$

In the above expression, the first term "$\alpha e^{j\pi/N \cdot (m+1/2)k}$" represents a wavefront reached at the point m on the display space, when the light is illuminated on the display device at the point k. While, the second term "$F_k$" represents a degree of the modulation at the point k on the display device.

The above expression $$\sum_{k=0}^{2N-1} \alpha e^{j\pi/N \cdot (m+1/2)k} \cdot F_k$$

can be rewritten as $$\alpha F_o + j\alpha F_N(-1)^m + \sum_{k=1}^{N-1} \alpha e^{j\pi/N \cdot (m+1/2)k} \cdot F_k + \sum_{k=N+1}^{2N-1} \alpha e^{j\pi/N \cdot (m+1/2)k} \cdot F_k$$

In the above expression, since $F_0 = 0$ and $$e^{j\pi/N \cdot (m+\frac{1}{2})(2N-k)} = -e^{-j\pi/N \cdot (m+\frac{1}{2})k}$$

So the expression can be rewritten as follows.

$$j\alpha F_N(-1)^m + 2j\alpha \Sigma F_k \sin(\pi/N \cdot (m + 1/2)k) =$$
$$j2N\alpha \left\{ 1/N \cdot (1/2 \cdot (-1)^m F_N + \sum_{k=0}^{N-1} F_k \sin(\pi/N \cdot (m + 1/2)k) \right\}$$

In the above expression, the term $$\text{"} 1/N \cdot \left( 1/2 \cdot (-1)^m F_N + \sum_{k=0}^{N-1} F_k \sin(\pi/N \cdot (m + 1/2)k) \right) \text{"}$$

represents an inverse discrete sine transform which produces the original image, at the point m i.e., $f_m$. Therefore, the following relationship stands
$$j2N\alpha \cdot f_m \propto f_m$$
That is, the resultant $j2N\alpha \cdot f_m$ is proportional to the intensity of the image to be reproduced.

In the above Case 1, the N discrete sine transform coefficients are developed over 2N points as indicated by "2N Modulation Components for Case 1" in FIG. 6.

Case 2

The loading method of the Case 2 is different from that of the Case 1. In the Case 2, 2N points are selected by taking k=−(N−1) to N.

For k=−(N−1) to N, the above equation (2) is expressed as follows.

$$F_k = F_k = 2 \sum_{n=0}^{N-1} f_n \sin(\pi/N \cdot (n + 1/2)(-k))$$
$$= -2 \sum_{n=0}^{N-1} f_n \sin(\pi/N \cdot (n + 1/2)k)$$
$$= -F_k$$

The above 2N points are loaded on the display device 12. If the thus loaded display device 12 is illuminated by a light 13 as shown in FIG. 8, a light intensity at a point m in a space on which the image is to be displayed (refer to FIG. 10), can be calculated as follows.

$$\sum_{k=1}^{N-1} \alpha e^{j\pi/N \cdot (m+1/2)k} \cdot F_k = j\alpha F_N(-1)^m + 2j\alpha \sum_{k=1}^{N-1} F_k \sin(\pi/N \cdot (m + 1/2)k)$$

$$= j2N\alpha \left\{ 1/N \cdot \left( 1/2 \cdot (-1)^m F_N + \sum_{k=1}^{N-1} F_k \sin(\pi/N \cdot (m + 1/2)k) \right) \right\}$$

In the above equation, the term $$\text{``} 1/N \cdot \left( 1/2 \cdot (-1)^m F_N + \sum_{k=0}^{N-1} F_k \sin(\pi/N \cdot (m + 1/2)k) \right) \text{''}$$

represents an inverse discrete sine transform which produces the original image at the point m, i.e., $f_m$. Therefore, the following relationship stands, $j2N\alpha f_m \propto f_m$ That is, the resultant $j2N\alpha f_m$ is proportional to the intensity of the image to be reproduced.

In the above Case 2, the N discrete sine transform coefficients are developed over 2N points as indicated by "2N Modulation Components for Case 2" in FIG. 6.

As mentioned above, a holographic stereogram requires that the condition that the "point of sight is sufficiently far compared with the size of the element hologram" stand. Therefore, when this condition does not stand, the desired distribution of intensity of diffraction light cannot be obtained. Specifically, the high frequency component of the distribution of intensity of diffraction light is lost and the distribution becomes blurred.

Therefore, for the element holograms to reproduce the distribution of intensity of diffraction light as desired, in the present invention, further, (i) compensation is applied in each element hologram so that the degree of modulation of the index of refraction gradually changes along with the increase in distance from the center and (ii) the amount of composition is revised in accordance with the variation in the distance between the element hologram and the point of sight.

Figure 9:
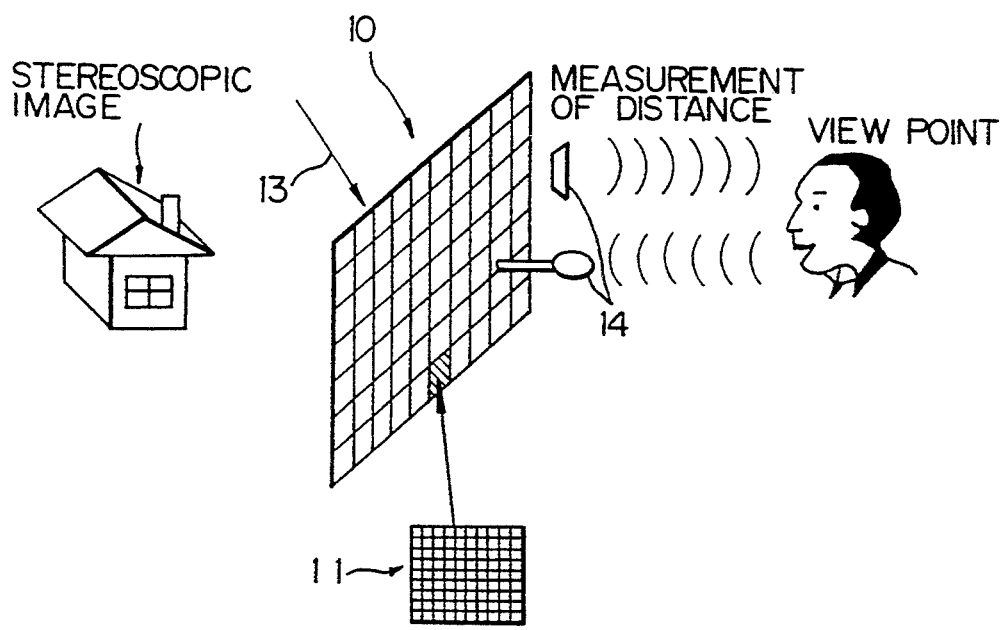
FIG. 9 is a view showing the application of revision to the amount of compensation in accordance with variations in the distance between the element hologram and the point of sight.

FIG. 8 is a view showing the state of application of compensation of the degree of modulation of the index of refraction for an element hologram, while FIG. 9 is a view showing the application of revision to the amount of compensation in accordance with variations in the distance between the element hologram and the point of eight. FIG. 8 corresponds to the above-mentioned (i) while Fig. 9 corresponds to the above-mentioned (ii).

As mentioned above, by revising the degree of modulation at each element hologram by a value depending on the distance from the center of the element hologram to the point where a transform is performed on the actually incident coherent light 13 and the distance from the element hologram to the point of sight, it is possible to realize a holographic stereogram which enables faithful reproduction of the distribution of intensity of diffraction light up to the high frequency component.

First, the value for modulating the incident coherent light is shifted from the value found by performing a Fourier transform (same even with sine transform) on the points of the element hologram by exactly the multiple of exp $(jkx^2/2L)$ where, j: complex unit x: distance of coefficient from center of element hologram k: number of waves of incident coherent light L: distance from element hologram to point of sight This is explained below.

FIG. 10 is a view explaining the compensation of the degree of modulation of the index of refraction.

Consider the element hologram 11 of the holographic stereogram shown in FIG. 10. The angle Of incidence of the coherent light to the element hologram 11 is $\phi$. Consider that the distribution (n(x) of degree of light modulation of the element hologram causes diffraction with the distribution of light intensity of $I(\theta)$ on a circular screen exactly a distance L from the center 0 of the element hologram.

Here, the light path difference at a point Q ($\theta = \theta_0$) on the circular screen in the case of light diffracted at the point 0 (x=0) and the point P (x=$x_0$) is found.

First, the light path difference $l_1$ of the light 13 incident at the point 0 and the point P becomes $l_1 = x_0 \cdot \sin \phi$ Further, the light path difference $l_2$ of (OQ−PQ) is $$\begin{aligned} l_2 &= OQ - PQ \\ &= L - (L^2 + x_0^2 - 2x_0 \cdot L \cdot \sin\theta_0)^{\frac{1}{2}} \\ &\approx x_0 \cdot \sin\theta_0 - x_0^2/2L \end{aligned}$$

therefore, the total light path difference 1 becomes $$\begin{aligned} l &= l_1 - l_2 \\ &\approx x_0 \cdot \sin\phi - x_0 \cdot \sin\theta_0 + x_0^2/2L \end{aligned}$$

From this, the light intensity measured at the point Q becomes as follows by using k as the wave number of the incident coherent light and integrating the light from the entire surface of the element hologram 11:

$$\begin{aligned} I(\theta_0) &= \int n(x) \cdot \exp(-jk(x \cdot \sin\phi - x \cdot \sin\theta_0 + x^2/2L)) \cdot dx \\ &= \int n(x) \cdot \exp(-jkx^2/2L) \cdot \exp(-jk(\sin\phi - \sin\theta_0)x) \cdot dx \end{aligned}$$

Here, if the following variable transform is performed:

$\Xi = \sin \phi - \sin \theta_0$ then $I(\Xi) = \int N(x) \cdot \exp(-jkx^2/2L) \cdot \exp(-jk\Xi x) \cdot dx$ and it is learned that $I(\Xi)$ becomes the Inverse Fourier transform of $n(x) \cdot \exp(-jkx^2/2L)$. From this, the term $n(x) \cdot \exp(-jkx^2/2L)$ is the Fourier transform of $I(\Xi)$. That is, $n(x) \cdot \exp(-jkx^2/2L) \propto \int I(\Xi) \cdot \exp(jk\Xi x) \cdot d\Xi$ From the above, the distribution of the degree of modulation of light intensity of the element hologram for reproducing the desired distribution of intensity of diffraction light becomes $$n(x) \infty \exp(jkx^2/2L) \cdot \int I(E) \cdot \exp(JkEx) \cdot dE$$

Compensation    Fourier trasnform of desired distribution of intensity of diffraction light The compensation term may be similarly multiplied even in Fourier (sine) transform of the desired distribution of intensity of diffraction light, Note that the above discussion stands similarly in both the one-dimensional and two-dimensional cases.

As seen in the above final equation, the value of the compensation term depends only on the distance x from the center of the element hologram and the distance L from the center of the element hologram to the point of sight (view point) and is not dependent on the viewing angle θ. This fact is true in the case of using a two-dimensional Fourier transform (two-dimensional sine transform) as well. Further, this compensation value is only the phase component. This means that in actuality it is sufficient to change only the light path difference in the display device 12, that is, the index of refraction. From this, to reproduce the desired distribution of intensity of diffraction light, it is sufficient to apply the following compensation.

First, consider the case where the position of the point of might of the observer from the hologram is substantially constant. In this case, in the above-mentioned compensation term, L is substantially fixed, so the compensation term depends on only the value from the center of the element hologram. That is, it can be calculated in advance. Therefore, it is possible to either change the index of refraction by exactly the light path difference with respect to the calculated modulation value or to install in the display device 12 from the start an index of refraction which realizes this light path difference (FIG. 8).

Further, when the point of sight of the observer changes, it is possible to use an ultrasonic sensor 14 etc. and measure the distance from the hologram (10) to the observer's head, calculate a compensation value calculated in accordance with this distance, and multiply it with the value found by the Fourier transform (FIG. 9).

Using the above method, it is possible to obtain the desired distribution of intensity of diffraction light and it is possible to realize a holographic stereogram which can be faithfully reproduced up to the high frequency components.

Specific numerical examples follow:
Distance to point of sight: L=300 mm=3.00×10⁻¹m
Wavelength of incident light: λ=633 nm=6.33×10⁻¹m Wave number: k=2π/λ=9.93×10⁶ rad/m In this case, the compensation term becomes:

$$\exp\left(jk\frac{x^2}{2L}\right) = \exp(j \times 1.65 \times 10^7 \times x^2) \quad (3)$$

From the above, if the distance (μm) from the center o the element hologram is made x, then the distribution n(x) of the index of refraction to actually perform the compensation becomes the following if the thickness Δ of the variable portion of the index of refraction is 2 μm:

$$n(x) = \frac{\lambda}{\Delta} \cdot \frac{1.65 \times 10^7 \times x^2}{2\pi} \quad (4)$$

$$= 0.317 \cdot \left(\frac{x}{6.17 \times 10^{-4}}\right)^2$$

In actuality, it is sufficient if the phase can be changed from 0 to 2π, so the index of refraction becomes:

$$n(x) = 0.317 \cdot \text{frac}\left(\left(\frac{x}{6.17 \times 10^{-4}}\right)^2\right) \quad (5)$$

(where, frac (a) is s function returning the decimal fraction portion of a).

Compensation is performed in accordance with this equation by applying the concentric circular distribution of index of refraction shown in FIG. 8 to the display device 12.

As explained above, according to the present invention, since it is sufficient to deal with only amplitude modulation, there is the advantage that the drive system of the display device for reproducing the stereoscopic image can be simplified.

Further, a sine transform corresponds to an orthogonal transform of image data, so the sine transform coefficients concentrate at the lower order terms and therefore it becomes possible to faithfully reproduce the original stereoscopic image.

We claim:

1. A holographic stereogram comprising:
hologram means comprises of an array of a plurality of element holograms each loaded with a unique modulation value corresponding to the stereoscopic image to be reproduced; and
irradiating means for reproducing said steroscopic image by irradiating the element holograms with coherent light, wherein
each of said element holograms is created by corresponding said unique modulation value defined by sine transform coefficients, in which the sine transform coefficients are specified by a sine transform or discrete sine transform of the distribution of intensity of diffraction light expressing the steroscopic image to be reproduced.

2. A holographic stereogram as set forth in claim 1, further comprising a display device which can spatially modulate light intensity, and in which amplitudes of light displayed on said display device are changed in accordance with the modulation values corresponding to the element holograms.

3. A holographic stereogram as set forth in claim 2, wherein if the number of samples for each of said element holograms is N (N being a positive integer), an N number of said sine transform coefficients and another N number of sine transform coefficients which are obtained by rearranging or inverting said sine transform coefficients are both produced over 2N modulation components and are loaded on said display device.

4. A holographic stereogram as set forth in claim 2, wherein in each element hologram, compensation is applied in advance so that the degree of modulation of the index of refraction gradually changes along with the increase of the distance from the center.

5. A holographic stereogram as set forth in claim 4, wherein said compensation amount is revised in accordance with variations in the distance between the element hologram and the point of sight.

6. A holographic stereogram as set forth in claim 2, wherein the element holograms are loaded with modulation values comprised of one-dimensional sine transform coefficients and are arranged in one direction for realization of a computer-generated one-dimensional holographic stereogram.

7. A holographic stereogram as set forth in claim 2, wherein the element holograms are loaded with modulation values comprised of two-dimensional sine transform coefficients and are arranged two-dimensionally for realization of a computer-generated two-dimensional holographic stereogram.

* * * * *